UNITED STATES PATENT OFFICE.

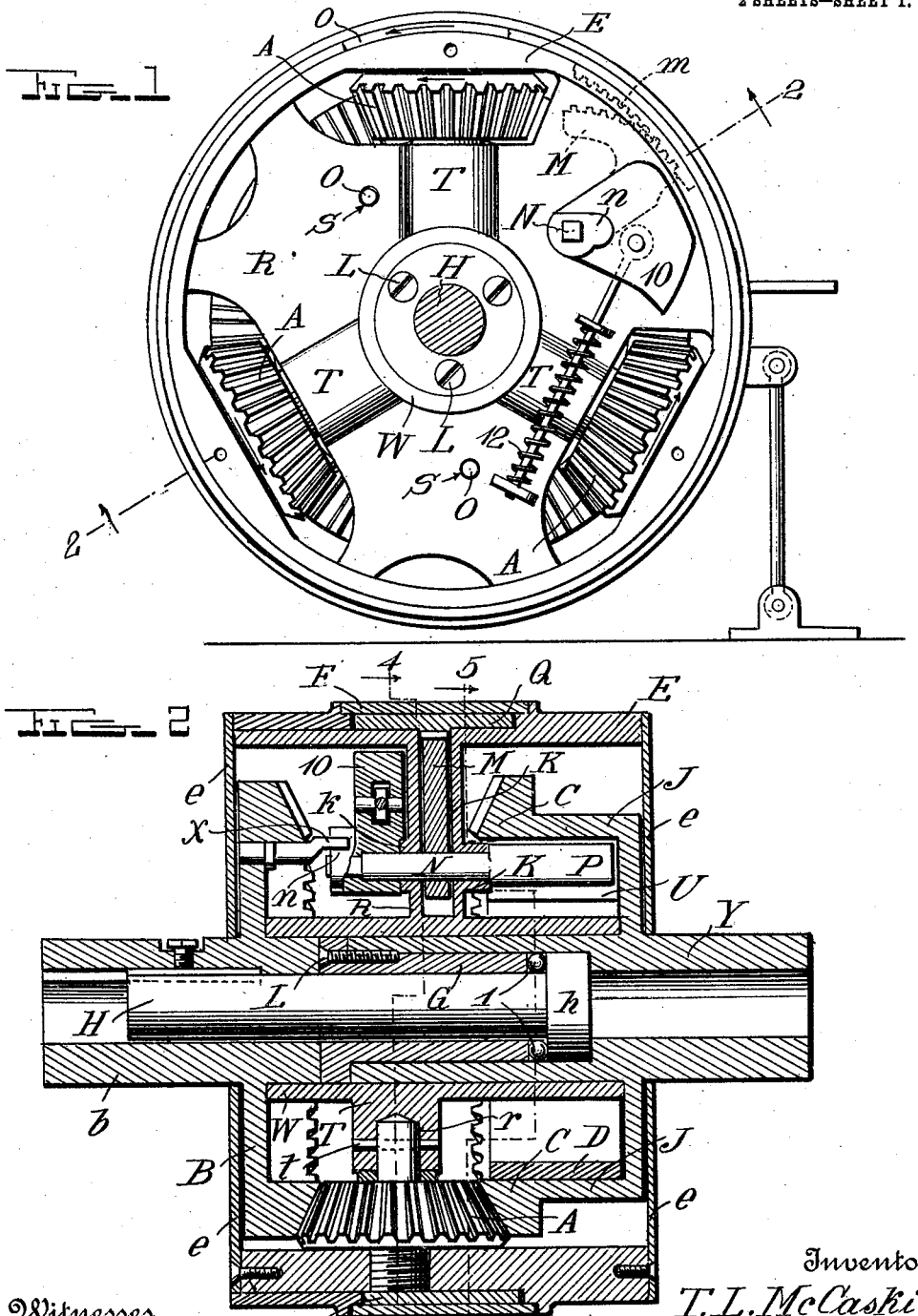

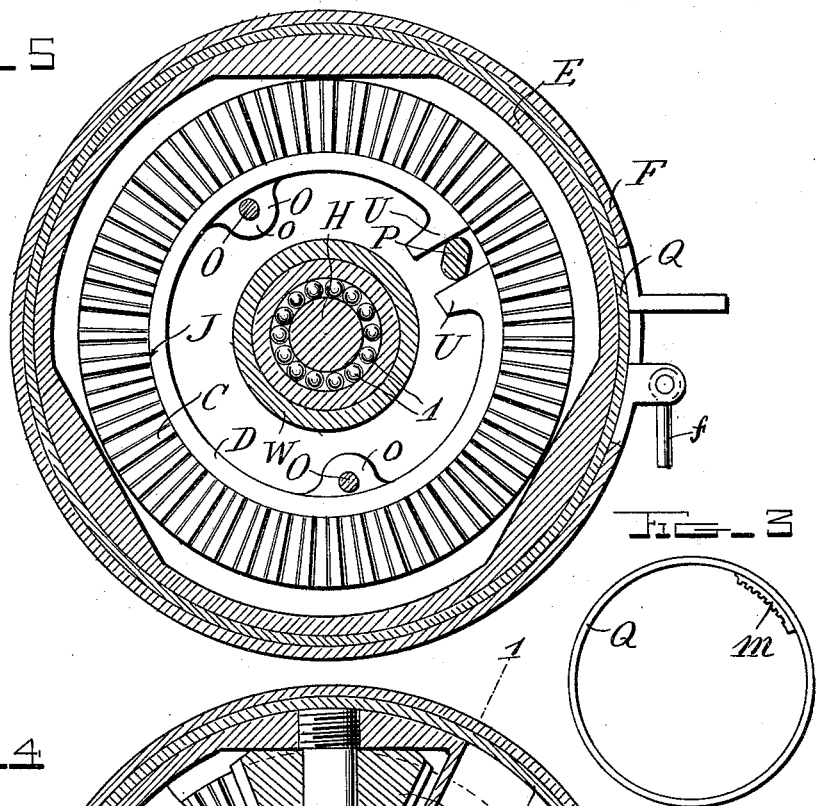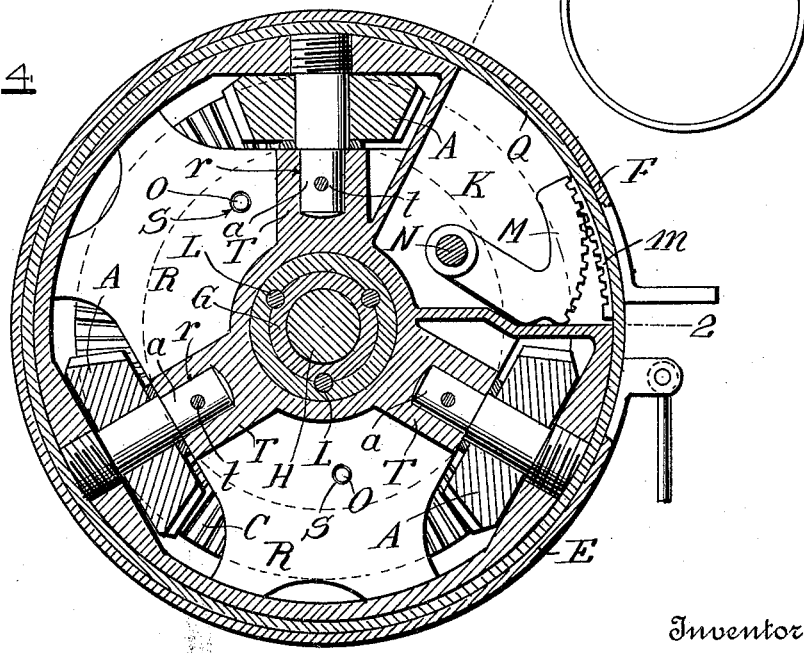

THOMAS L. McCASKILL, OF ALBANY, GEORGIA.

REVERSING-GEARING.

940,889.  Specification of Letters Patent.  Patented Nov. 23, 1909.

Application filed May 3, 1909. Serial No. 493,639.

*To all whom it may concern:*

Be it known that I, THOMAS L. MCCASKILL, a citizen of the United States, residing at Albany, in the county of Dougherty and State of Georgia, have invented certain new and useful Improvements in Reversing-Gearing; and I do declare the following to be a full, clear, and exact description of the invention, such as will enable others skilled in the art to which it appertains to make and use the same.

This invention relates to reversing gearing.

The object of this invention is to provide a gearing of this character having means whereby the connection between the power and load is accomplished automatically, with a slight momentary decrease in the speed of the engine, this being an advantage in reducing the possibility of breakage due to sudden shock when the gearing is thrown into working position.

Another object is to provide a reversing gearing whereby all motions are derived through frictional contact thus preventing sudden jar, shock or strain being brought to bear on any part or parts to the detriment of any other part of the mechanism.

A further object is to provide a gearing of this character which will be simple and compact in construction, having comparatively few parts and which requires no separate or independent foundation, and can be connected with any line of shafting without interfering with the alinement thereof, and which requires no adjustment, and is positive and reliable in action, perfectly balanced and so constructed that all gears are constantly in mesh, and so arranged that all working parts run in oil.

With these and other objects in view, the invention consists of certain novel features of construction, combination and arrangement of parts, as will be more fully described and particularly pointed out in the appended claims.

In the accompanying drawing, Figure 1 is a front end elevation of the gearing with the main driving gear removed to disclose the interior arrangement of the parts. Fig. 2 is a central longitudinal sectional view through the complete device; Fig. 3 is an end elevation of the reversing ring; Fig. 4 is a vertical transverse section on the line 4—4 of Fig. 2, showing the construction of the oil pocket and position of the toothed segment and cam shaft; Fig. 5 is a similar view on the line 5—5 of Fig. 2.

In the embodiment of the invention, I provide a brake cylinder or drum E, the ends of which are preferably closed or covered by circular plates e, and so arranged as to provide an oil tight compartment in which oil is carried for the purpose of lubrication.

Around the brake cylinder E is placed a sliding reversing ring Q, having on its inner surface a segmental rack m, which is adapted to operate a toothed segment M which is so arranged that it will slide between the ends of pocket K, which act as stops therefor. Upon the outer surface of reversing ring Q is placed a brake band F, said band being supported in any suitable manner. The drum or cylinder E is provided with an interior web R and a hub W. In the web R are formed a series of radially disposed bearing bosses T and transverse apertures r in which are revolubly mounted a series of beveled pinions A, three of said pinions being shown in the present instance. The pinions A are revolubly mounted on pintles a, the inner ends of which are engaged with sockets formed in the bosses T, through which are passed dowel pins t, while the outer ends of said pintles have a screw threaded engagement with threaded apertures formed in the drum or cylinder E. In the web R between the bosses T is formed an oil tight pocket K in which is placed a toothed segment M, the toothed peripheral surface of which projects slightly beyond the outer surface of the brake cylinder E through a transverse slot provided therefor, and engages with a segmental rack m on the reversing ring Q.

The toothed segment M operates in the same line of motion with the brake drum E, but has a smaller radius, and is arranged to actuate a cam shaft N, on which it is mounted, and which is pivotally disposed in suitable bearings k arranged in the walls of the pocket K. On one end of the shaft N outside of said pocket is placed a cam n having a weight 10 and at the other end of said shaft is formed an elongated cam P.

In one end of the drum E is arranged a main beveled driving gear B, the hub b of which is extended beyond the outer side of the gear and is adapted to receive the end of a driving shaft (not shown). In the opposite end of the hub b is keyed the inner end of a spindle H on the outer end of which is formed a head $h$. On the inner web of this gear and at a suitable point is disposed a lug X, one end of which is beveled or inclined. In the opposite end of the drum or cylinder E is arranged a power transmitting gear C, said gear being formed on the inner edge of a clutch cylinder J. The cylinder J is provided with a hub Y, the inner end of which is extended inwardly and bored to receive the end of the spindle H and its head, $h$. Around the spindle H is arranged a bushing G which is preferably held in position by locking screws L. Between the inner ends of the bushing and the head $h$ of the spindle is arranged a series of bearing balls $l$. This bearing is to receive the back thrust when in a reverse motion. The hub Y is extended beyond the opposite or outer end of the clutch cylinder and is bored to receive the end of a power transmitting shaft (not shown).

Arranged within the clutch cylinder J is a friction clutch ring D, said ring being opened at a point in its periphery and the ends of the ring are increased in thickness to provide opening jaws U. At suitable points within the inner surface of the ring are arranged inwardly projecting radially disposed lugs $o$ in one end of which are placed laterally projecting pins O which are adapted to engage with the sockets S formed in the web R of the brake cylinder and causing said friction ring to move with the drum E, the combination of said lugs $o$ and pins O with sockets S also serving to hold the jaws U of the friction ring D in a fixed relation to the expanding cam P which is operatively disposed between said jaws and which is adapted to force them apart, thereby expanding said ring into frictional engagement with the clutch cylinder J, thereby locking said cylinder into engagement with the brake cylinder E.

The bevel pinions A are disposed between the main driving gear B and the power transmitting gear C and serve to operatively connect the two gears.

In the operation of the device, when the brake band F is tightened, the drum E will be held fixed while the driving gear B will continue to run on the pinions A and drive them in the direction indicated by the arrows in Fig. 1 which will cause the power transmitting gear C to rotate in the opposite direction. This movement will also cause the toothed segment M to remain in the position shown in Fig. 4 which allows the lug X to pass over the cam $n$ and also causes the elongated cam P to be held down thereby releasing the tension on the expanding ring D and allowing the cylinder J to revolve freely around the friction ring D.

Forward motion is obtained by releasing the tension of the brake band F and allowing the drum E to run free and in the same direction with the driving gear B. This motion causes the segment M to be thrown into position shown in Fig. 1. The segment M is actuated by centrifugal force due to the weight 10, the momentum of which is accelerated by a spring 12, as clearly shown in Fig. 1 of the drawings. This motion causes the ring Q to slide on the drum E in the direction indicated by the arrow at Q, Fig. 1, and brings the cam $n$ in the line of movement of the beveled lug X. The increased speed of B over E causes the lug X to be brought into engagement with the cam $n$ and tending to force said cam around and thereby turning the shaft N and forcing the cam P thereon more firmly between the jaws U of the friction ring D, thereby locking the ring D and clutch cylinder J, which action holds the gear C against independent movement and locks the pinions A against revolution. The speed of the gear B over E is graduated by the friction between the friction ring D and the clutch cylinder J, which is induced by the action of the weight 10 and the spring 12. This locking of the gear C on the pinions A causes the motion of the driving gear B to be transmitted direct to the gear C through the pinions A thus causing the whole structure to rotate with the driving gear B and in the direction which the driving power is revolving. All the parts being thus firmly locked by the increased pressure brought to bear through the cam P on the jaws U which is due to the power applied to the gear B and the load on the gear C through frictional contact between the gear C and the cylinder J and the interlocking of all gears, the connection between the gears B and C will be continuous and rigid and can only be broken by the tightening of the brake band F on the reversing ring Q, when the action of the segmental rack $m$ upon the outer toothed surface of the segment M causes said segment to be carried into the position shown in Fig. 4, thus turning the cam $n$ back. The slight frictional contact between the lug X and the cam $n$ is broken by the greater leverage exerted thereon through the segment M which causes the cam $n$ to slide under the lug X thus turning the shaft N and cam P and releasing the ring D from the clutch cylinder J, causing the gear C to travel again in an opposite direction to the driving gear B whereby the motion of the driven or power transmitting gear is again reversed.

A neutral or stop motion for the driven shaft is obtained by applying the brake band F to a sufficient extent to break the contact between the clutch cylinder J and the friction ring D by holding the segment M in an inoperative position, as hereinbefore described, in this position the brake is not applied to such an extent as to materially retard the motion of the drum E but allowing the drum E and ring Q to run in the brake band F which motion causes the segment M to be held at the position shown in Fig. 4, and allows the pinions A to travel freely on or around the gear C, said gear C being held in fixed position by the load on the driven shaft. One end of the brake band F is here shown as being secured by the rod *f* to a suitable support or fixed connection and to the opposite end of the brake band may be connected any suitable form of operating lever (not shown).

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having described my invention, what I claim is:

1. A reversing gearing comprising a main driving gear, a revolubly mounted brake cylinder, a brake band adapted to hold said cylinder against rotation, a series of power transmitting gears revolubly mounted in said brake cylinder, and operatively engaged with said driving gear, a driven or power transmitting gear operatively engaged with said pinions, a clutch connection between said driven gear and said brake cylinder, and means whereby said clutch mechanism is automatically operated to lock said driven gear and to release the same from engagement with said brake cylinder whereby the motion of said driving gear is imparted to said driven gear to turn the same with the driving gear or in a reverse direction thereto.

2. A reversing gearing comprising a main driving gear, a driving shaft, means to secure said driving gear to the driving shaft, a combined driven or power transmitting gear and clutch cylinder operatively connected with said driving gear, a revolubly mounted brake cylinder, a series of power transmitting pinions arranged between and operatively engaged with said driving and driven gears, a friction band arranged in said clutch cylinder, and means operated by the movement of said brake cylinder to engage said friction band with said clutch cylinder and to release the same therefrom whereby said driving and driven parts of the device are locked together and released to cause the driven or power transmitting gear to be turned in the direction of the driving gear or in a reverse direction thereto.

3. A reversing gearing comprising a main drive gear, having a revolubly mounted clutch cylinder and a power transmitting or driven gear formed thereon, a revolubly mounted brake cylinder, a brake band arranged around said cylinder, a series of power transmitting pinions carried by and revolubly mounted in said brake cylinder and adapted to operatively connect said driving and driven gears, a friction ring arranged in said clutch cylinder, an expanding mechanism engaged with said ring whereby the latter is expanded into frictional engagement with said clutch cylinder, a reversing ring on said brake cylinder, and means actuated by the said brake band and reversing ring to automatically control said expanding mechanism.

4. A reversing gearing comprising a main drive gear having a hub, a spindle secured in one end of said hub, a combined driven gear and clutch cylinder revolubly mounted on said spindle, a brake cylinder having an interiorly arranged web and hub, and revolubly mounted on the hubs of said driving and driven gears, said web having a series of radially disposed apertures, a brake band to control said brake cylinder, a series of power transmitting pinions revolubly mounted in the apertures of said web and adapted to operatively connect said driving and driven gears, an open friction ring arranged in said clutch cylinder having expanding jaws on the open ends thereof, means to connect said ring with said brake cylinder, an expanding cam arranged between the jaws of said friction ring, and means to operate said cam to force said ring into operative engagement with said combined driven gear and clutch cylinder whereby said gear is locked against independent revolution and caused to turn with said main drive gear.

5. A reversing gearing comprising a main drive gear, a revolubly mounted brake cylinder, a combined driven gear and clutch cylinder, a series of pinions arranged between said main drive gear and said driven gear, whereby they are operatively connected together, an expansible friction ring arranged in said clutch cylinder, means to connect said ring with said brake cylinder, a cam shaft carried by said brake cylinder, an expanding cam on one end of said shaft adapted to expand said friction ring into operative engagement with said clutch cylinder, a toothed segment mounted on said cam shaft, a reversing ring having arranged thereon a segmental rack to engage said toothed segment, a brake band to control said brake cylinder and reversing ring, and means arranged on said cam shaft to facilitate the operation thereof by said toothed segment and reversing ring.

6. A reversing gearing comprising a main drive gear, a revolubly mounted brake cylinder, a combined driven gear and clutch cylinder, a series of pinions arranged between said main drive gear and said driven gear, whereby they are operatively connected together, an expansible friction ring arranged in said clutch cylinder, means to connect said ring with said brake cylinder, a cam shaft carried by said brake cylinder, an expanding cam on one end of said shaft adapted to expand said friction ring into operative engagement with said clutch cylinder, a toothed segment mounted on said cam shaft, a reversing ring having arranged thereon a segmental rack to engage said toothed segment, a brake band to control said brake cylinder and reversing ring, a weighted cam arranged on said cam shaft, a cam engaging lug carried by said main drive gear, and an operating spring engaged with said weight to assist the same in operating its cam.

7. In a reversing gearing, a revolubly mounted brake cylinder having a chambered web and hub, closing plates arranged on the opposite ends of said cylinder to provide oil spaces on the opposite sides of said web, a main driving gear revolubly mounted in one end of said brake cylinder, a combined driven gear and clutch cylinder revolubly mounted in the opposite end of said brake cylinder, a series of pinions revolubly mounted in the web of said brake cylinder and operatively connecting said main drive gear with said driven gear, a friction ring arranged in said clutch cylinder, and connected with said brake cylinder, a cam shaft mounted in the web, a cam on one end of said shaft to operatively engage said friction ring, a weighted spring actuated cam on the opposite end of said shaft, a toothed segment fixedly mounted on said cam shaft within said pocket, a reversing ring loosely mounted on said brake cylinder, a segmental rack arranged on said ring to operatively engage said toothed segment, and a brake band arranged around said brake cylinder and reversing ring.

In testimony whereof I have hereunto set my hand in presence of two subscribing witnesses.

THOMAS L. McCASKILL.

Witnesses:
  Jno. D. Twiggs,
  Robt. P. Hall.